B. WALTER.
REGULATING CONCENTRATOR.
APPLICATION FILED SEPT. 19, 1910.
1,019,935.
Patented Mar. 12, 1912.
2 SHEETS—SHEET 1.
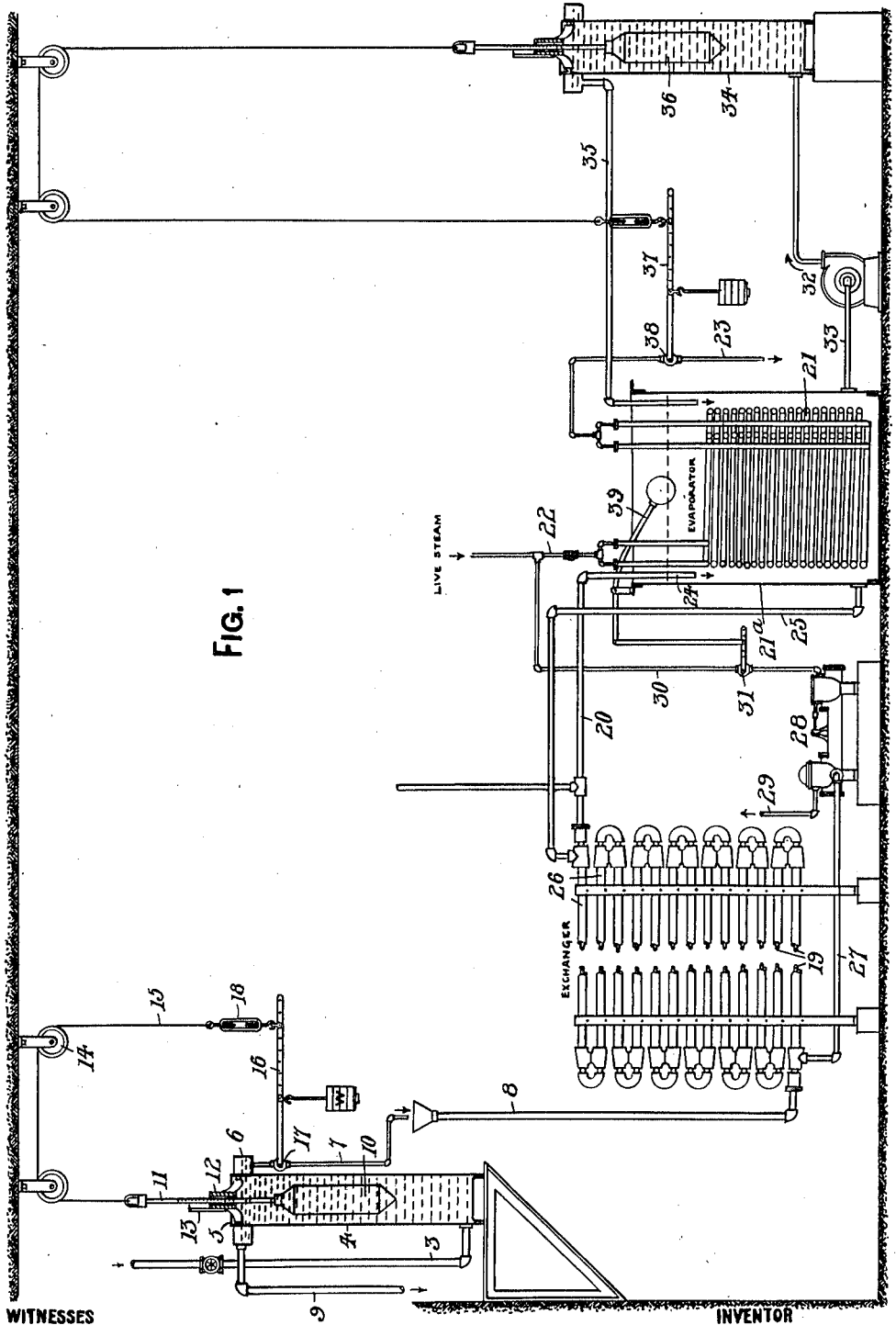

B. WALTER.
REGULATING CONCENTRATOR.
APPLICATION FILED SEPT. 19, 1910.
1,019,935.
Patented Mar. 12, 1912.
2 SHEETS—SHEET 2.
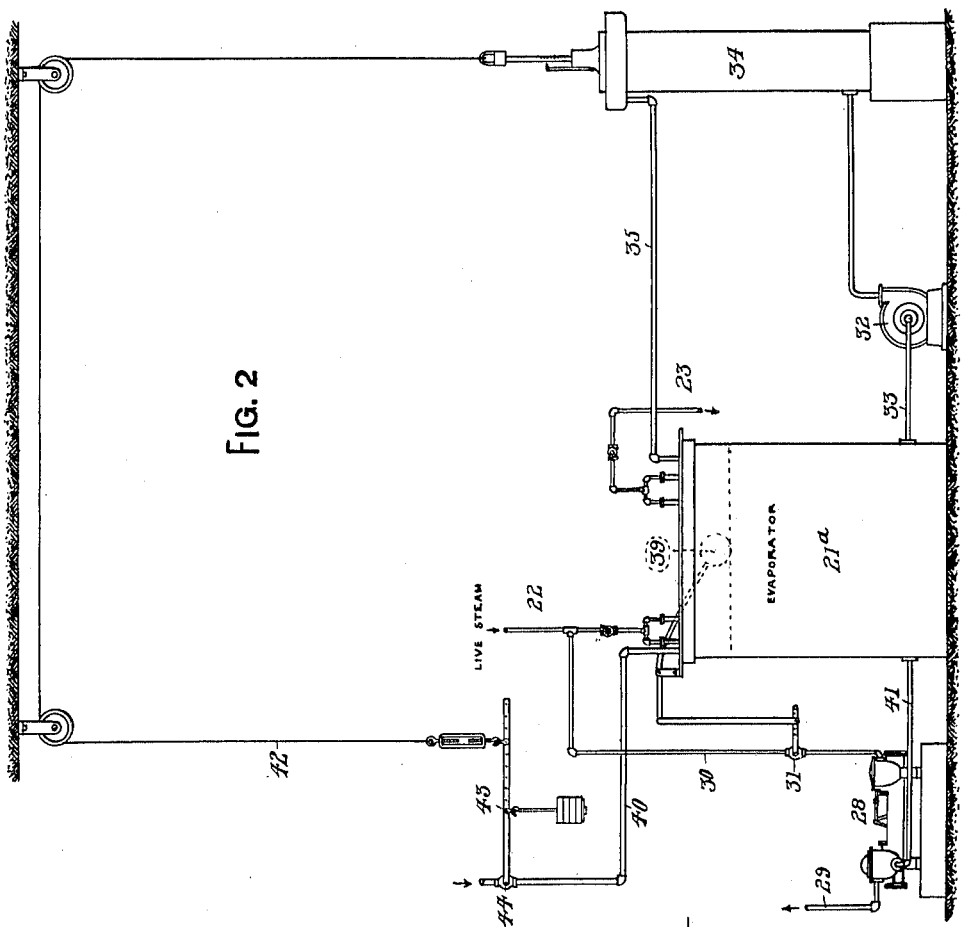
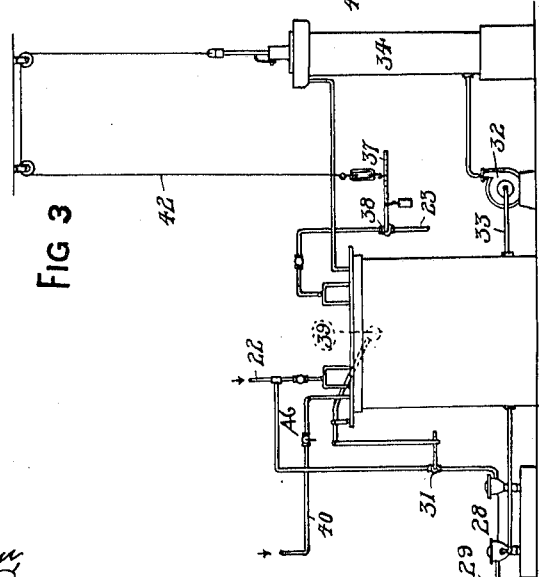
WITNESSES
INVENTOR
Bruce Walter

UNITED STATES PATENT OFFICE.

BRUCE WALTER, OF PITTSBURGH, PENNSYLVANIA.

REGULATING-CONCENTRATOR.

1,019,935.

Specification of Letters Patent. Patented Mar. 12, 1912.

Application filed September 19, 1910. Serial No. 582,620.

*To all whom it may concern:*

Be it known that I, BRUCE WALTER, a citizen of the United States, residing at Pittsburgh, in the State of Pennsylvania, have invented a certain new and useful Regulating-Concentrator, of which the following is a specification.

My invention relates generally to the art of concentrating liquids, and its primary object is to provide means for automatically concentrating a liquid of varying density to a uniform and predetermined density.

Other objects will hereinafter appear.

I have illustrated the invention in one form as particularly applied to the concentrating of brine for example, in the accompanying drawing, in which—

Figure 1 is a side elevation partially in diagram and partially in section, showing in vertical section the hydrometer regulator. Fig. 2 is a side elevation showing a modification, and Fig. 3 shows another modification.

Heretofore in the practice of concentrating liquids such as brine, or acids, it has been customary to pass the material through a heating device and regulate the flow of the liquid, or the amount of heat employed by hand valves, which are manipulated in accordance with the indications of density as obtained by occasional testing with a hydrometer. Except for such manipulation, the condition of concentration is thus dependent upon the density of the liquids as introduced into the concentrating apparatus; and so far as I am aware there has been no automatic coöperation between the heating device and the condition of the liquid as introduced; nor has there been any continuous indication of the density of the outcoming liquid, nor regulation thereof by any automatic means. In my preferred apparatus the volume of the inflow to the concentrator is regulated according to its density,—that is, the product of density times volume of fluid taken in, is automatically maintained constant. Incidentally the heat applied to the liquid to evaporate it is by means of a heat exchanger, used in a more economical manner so as to return the liquid at a comparatively low temperature; and the heating device is automatically controlled according to the condition of the outflowing liquid. That is, the returning liquid is automatically maintained at a uniform density by controlling the amount of heat applied proportionally to the amount of heat required by the fluid flowing through the system. Thus in the accompanying drawing I have illustrated an automatic regulating brine concentrator in which the cold brine is taken in at the pipe 3 and passes upward through a chamber 4, over an annular weir 5 into an annular pan 6 and thence by pipes 7 and 8 to the heating device as hereinafter to be described. I prefer to keep a part of the liquid from the tank 4 overflowing by pipe 9 in order to preserve a constant level and condition in the tank 4, which is employed for the operation of a hydrometer. This latter consists of a submerged bulb 10 whose stem 11 is graduated and guided by a spider 12 which carries a pointer 13 coöperating with the scale. The top of the stem 11 is connected by overhead pulleys 14 and a cord 15 to the weighted lever arm 16 of a valve 17 which controls the flow to the evaporator. It will be noted that by this device, the valve 17 allows a greater or less flow accordingly as the liquid in tank 4 is respectively of less or greater density, so that in a given time the product of the volume of liquid into its density will be constantly uniform. The scale 11 indicates the density and the valve operating arm 16 is correspondingly graduated in order to control as just described, or otherwise the valve may be regulated in position by turnbuckle 18.

The liquid passes from pipe 8 through a heat exchanger which is preferably made in the form of a coil or series of loops of the inner pipe 19 leading to the evaporator by pipe 20, and surrounded by outer pipes 26, which carry back the returning liquid coming from the evaporator. The evaporator is essentially a tank 21ᵃ having any convenient means for heating it and regulating a pump by the level therein. It is here shown as heated by coils 21 of a steam pipe connected to a feeder 22 and exhausting through a branch 23. The liquid enters at the mouth of pipe 20 and is taken out of the tank 21ᵃ at the bottom through pipe 25 which connects to the outer jacket pipes 26 in the heat exchanger and has an outlet through pipe 27 to a pump 28 which by its outlet 29 returns the concentrated liquid to the place where it is to be used. The steam pipe 30 operating the pump 28 has a valve 31 regulated by a float 39 in the evaporating tank 21ª so that a constant level is maintained in the latter.

It will be understood that the evaporator may be heated by gas flames or in any other convenient manner, and I provide means by which the amount of heat and therefore the rate of evaporation is automatically controlled by the density of the liquid in evaporating tank. Thus in the case shown, I employ a small motor driven pump 32 which takes a quantity of the liquid from tank 21ª by pipe 33 and empties it into the regulator 34, whence it passes back by pipe 35. The regulator tank 34 is similar in construction to tank 4 previously described. The hydrometer bulb 36 having its graduated stem connected by pulleys and adjustable cord to the counter-weighted and graduated valve arm 37, operating a valve 38 which controls the flow of steam in the heater for the evaporator by regulating the outflow of the exhaust. (It is of course obvious that in case of another heating device such as gas flames under the tank 21ª, this valve 38 would be in the gas supply pipe). And it is also obvious that my invention is not limited to the use of a hydrometer for controlling the valve, as any of the well known forms of thermostat having movable part could be inserted in the tank 21ª and the movable part attached to the valve regulating device, thus controlling the concentration according to the temperature or density of the liquid.

It will be noted that by the above described arrangement the liquid is returned in a condition of constant and uniform density, which is automatically regulated by the hydrometer bulb 36. That is, the concentrating system takes in the liquid in greater or less volume accordingly as it needs more or less concentration to reduce it to the standard, and meanwhile, the amount of evaporation is controlled by the condition of the liquid being treated. The apparatus is continuous and automatic, needing no attention and constantly indicating the strength both of the inflowing and the outflowing liquid. It will be observed that incidentally a failure of the supply of liquid to be concentrated would result in automatically stopping the flow of the liquid through the concentrator, as well as shutting off the supply of heat.

In some cases it will be sufficient to regulate the amount of fluid taken in, by the density of the fluid being treated. For example, in the modification shown in Fig. 2, the liquid to be treated is introduced directly through pipe 40 into the evaporator 21ª and taken out through the pipe 41 and returned by the pump 28 and delivered to pipe 29 as before. Also the regulator 34 operates in the same way as before except that instead of regulating the amount of heat applied in the evaporator, it operates by the cord 42 a graduated operating arm 43 of a valve 44 in the inlet pipe 40. Thus when the liquid requires more concentration to bring it to the desired standard for delivery, the regulator acts to reduce the amount of inflow, and vice versa when the liquid is already so dense as to require less evaporation, the device automatically opens valve 44 and permits a greater inflow.

One of the essential points in either form of the apparatus, is that the fluid after treatment is delivered at a uniform density, its treatment being regulated in the one case by varying the amount of heat applied, and in the other by varying the amount of fluid taken in.

Where the liquid to be treated, though of varying density is to be received in the system in constant quantity, the concentrator is to be operated so as to vary the amount of concentration according to the density of the incoming fluid and therefore deliver the fluid at the uniform density. Thus, in Fig. 3, the arrangement of the apparatus is essentially the same as in Fig. 1 except that the feeding-in pipe 40 merely has a hand-operated valve 46 and the regulator 34, by means of valve 38 governing the amount of heat according to the density of the liquid being treated. That is, the liquid in the evaporator 21ª will be delivered by the pump 28 at a rate which is dependent upon the rate of concentration, or in other words, the density of the liquid being treated will govern the outflow. It will be understood that the different modes of manipulation mentioned are to be used according to the condition under which the fluid is to be operated upon, as for instance in drying air by direct contact with cold brine it is essential that the brine be kept sufficiently dense to prevent freezing and it is desirable that it should be at a constant density. Various other uses of the invention will readily occur to those familiar with the art.

Having thus described my invention and illustrated its use, what I claim is the following:

1. Apparatus for continuously concentrating fluids comprising an evaporator and a regulator governing the action of the evaporator according to the density of the fluid being acted on.

2. Apparatus for concentrating fluids comprising an evaporator and a regulator for the rapidity of action of the evaporator governed by the density of the fluid delivered therefrom.

3. Apparatus for concentrating liquids comprising an evaporator, a hydrometer regulator, and a heating device governed by said regulator, whereby the heat is applied in regulated quantity according to the amount of evaporation necessary to reduce to a constant density.

4. Apparatus for concentrating liquids comprising a feeding device governing the amount of liquid introduced according to its density, a variably acting evaporator and an evaporator governor controlled by the density of the fluid in the evaporator.

5. Concentrating apparatus comprising an evaporator, a hydrometer regulator, a pump for supplying the latter from the evaporator, a heating device and means to regulate the heat, operated by said regulator.

6. In apparatus for concentrating liquids, a regulator for the density of the output comprising means to constantly draw off a sample of the liquid being operated upon, and a hydrometer operated thereby and in turn controlling the heating operation of the evaporator.

7. The combination with a liquid supply, of a hydrometer and valve regulating the flow from said supply in proportion to its density, an evaporator and a hydrometer regulating the speed of operation of the evaporator so as to cause a delivery of constant density.

8. Apparatus for concentrating liquids comprising means to take in the raw liquid at a rate dependent upon its density, an evaporator, and means to regulate the operation of the evaporator in accordance with the density of the liquid being operated on, whereby to deliver the liquid at a uniform density.

9. Apparatus for concentrating liquids comprising an evaporator having means to maintain a constant volume of liquid therein, and a device governing the speed of operation of the evaporator in accordance with the density of the liquid being acted upon.

In testimony whereof I have hereunto signed my name in the presence of the two subscribed witnesses.

BRUCE WALTER.

Witnesses:
  CHAS. S. LEPLEY,
  HENRY SENS.